United States Patent [19]
Hinshaw

[11] Patent Number: 6,101,962
[45] Date of Patent: Aug. 15, 2000

[54] MACHINE SHADOW EMBROIDERY AND METHOD

[76] Inventor: Suzanne B. Hinshaw, 214 Shady Oaks Cir., Lake Mary, Fla. 32746

[21] Appl. No.: 09/071,479

[22] Filed: May 1, 1998

[51] Int. Cl.$^7$ .............................. D05C 17/00; B32B 7/08
[52] U.S. Cl. ...................................... 112/475.22; 112/439
[58] Field of Search ......................... 112/475.22, 475.18, 112/475.21, 475.23, 439

[56] References Cited

U.S. PATENT DOCUMENTS

| | | | |
|---|---|---|---|
| 889,614 | 6/1908 | Johnsen | 112/439 X |
| 924,795 | 6/1909 | Klemm et al. | 112/475.22 |
| 2,141,560 | 12/1938 | Rudnick | 112/475.22 X |
| 3,040,332 | 6/1962 | Kleinwald | 112/475.22 X |
| 3,771,479 | 11/1973 | Mavis | 112/475.22 |
| 4,092,451 | 5/1978 | Sernaker | 428/102 |
| 4,140,563 | 2/1979 | Sernaker | 156/148 |
| 4,284,021 | 8/1981 | Kaye | 112/439 |
| 4,549,494 | 10/1985 | Murphy | 112/475.22 |
| 4,821,662 | 4/1989 | Pongrass et al. | 112/266.1 |
| 5,111,760 | 5/1992 | Garzone, Jr. | 112/439 |
| 5,241,919 | 9/1993 | Lagreca | 112/475.23 X |
| 5,299,514 | 4/1994 | Hayakawa et al. | 112/121.12 |
| 5,474,000 | 12/1995 | Mizuno et al. | 112/102.5 |
| 5,592,891 | 1/1997 | Muto | 112/475.19 |

Primary Examiner—Ismael Izaguirre
Attorney, Agent, or Firm—Edward M. Livingston, Esq.

[57] ABSTRACT

Shadow work embroidery designs which can be performed by a sewing machine, preferably a computerized machine with digitized design embroidery patterns. The method employs at least two layers of material, an outer layer (8) of fabric which allows color to show through and an inner layer or layers (6,11), such as fabric or a removable stabilizer. On the inner layer of material is sewn an interior of a selected embroidery design (7) which is filled in with machine stitching. Once completed, an outer layer of garment fabric (8) is placed over the inner layer of material and an outline (9) of the selected embroidery design is stitched on the outer layer of material through the inner layer of material so that both layers of material are sewn together. If the inner layer of material is a removable stabilizer than the outline stitch (9) must catch the edges of the threads of the embroidered design (7). The excess of the inner layer outside the design pattern may be trimmed or left whole when the inner material is a removable stabilizer, the stabilizer can be removed leaving only the embroidery threads attached to the inside surface of the outer layer of the garment fabric and an outline stitch on the outside surface of the outer layer. This method produces shadow work embroidery similar to or better than that achieved by hand stitching in substantially less time and cost.

7 Claims, 2 Drawing Sheets

MACHINE SHADOW EMBROIDERY AND METHOD

BACKGROUND OF THE INVENTION

This invention relates to embroidery and more particularly to a method for performing shadow work embroidery with a sewing machine which yields shadow work embroidery that looks like fine shadow work embroidery performed by hand.

Normally, shadow work embroidery can only be accomplished by hand stitching. Hand stitched shadow work embroidery involves stitching with needle and thread along an outline of a design on the front of the fabric while performing a crossover stitch on the back of the fabric to yield a shadow appearance on the front of the fabric caused by the color of the thread showing through the front of the fabric. Such hand stitching is very time consuming, often taking many days for each design. Thus, clothing containing hand stitched shadow work embroidery can be very time consuming to make and costly to buy.

As a consequence, many people have tried to duplicate hand stitched shadow work embroidery using a sewing machine. Unfortunately, unlike manual stitching an embroidery sewing machine cannot perform an outline stitch on the front of fabric and a crossover stitch on the back of fabric at the same time and another method must be employed.

Thus, a need exists for a method of performing shadow work embroidery using a sewing machine that is equal to or better in appearance to hand stitched shadow work embroidery and yet can be performed in much less time.

In the prior art, one method used to perform shadow work embroidery with a machine has been to place a color fabric behind a sheer fabric, sew an outline stitch through both fabrics and cut away the excess color fabric next to the outline so the color appears from the underlying fabric through the outer fabric in the shape of the outline stitch. However, as there are no threads used for the coloration of the shadow effect as in shadow work embroidery, an observer sees just the color shadowing through the outer fabric from the trimmed color fabric on the underside. This method also requires that you must not only change the color thread for each section of the embroidery, but also stop the process of the embroidering by machine to clip away the color fabric from behind before another section of that embroidery can begin. Thus taking excess time to stop the outline process of embroidering, taking time to trim the colored fabric, reinsert another color of fabric behind the embroidered piece to do the next section of the outline of the design. Thus, this method is limiting and also time consuming to the machine stitcher.

U.S. Pat. No. 5,592,891 issued to Muto on Jan. 14, 1997, teaches a method of performing shadow work embroidery using a sewing machine to fill in stitches between an outline to yield a somewhat shadow work embroidery effect. U.S. Pat. Nos. 4,140,563 and 4,092,451 issued to Sernaker on Feb. 29, 1979 and May 30, 1978, respectively, teach a method and apparatus for making embroidery transfers using two layers of fabric and heat. It does not involve using a sewing machine. U.S. Pat. No. 4,284,021 issued to Kaye on Aug. 18, 1981 discloses a woven tri-axile fabric of yarn for use in needlepoint but it does not employ a machine. U.S. Pat. No. 5,111,760 issued to Garzone, Jr. on May 12, 1992, discloses patterns made from multi-embroidered lace layers but again does not employ a sewing machine. U.S. Pat. No. 5,474,000, issued to Mizuno, et al. on Dec. 12, 1995, discloses an apparatus used in U.S. Pat. No. 5,592,891 discussed above. U.S. Pat. No. 5,299,514 issued to Hayakawa, et al. on Apr. 5, 1994, discloses another process and apparatus for producing machine embroidery but it is not like the present invention. Finally, U.S. Pat. No. 4,821,662 issued to Pongrass, et al. on Apr. 18, 1989, teaches another method and apparatus of performing machine embroidery.

None of the prior art is like the present invention which enables one to produce a shadow work embroidery effect that simulates or is even better than hand stitched shadow work embroidery.

The present invention provides such a method which reduces substantially the time to produce a shadow work embroidery design. For instance, a design that might take eight hours by hand stitching would take less than fifteen minutes using the method taught by the present invention.

SUMMARY OF THE INVENTION

The primary object of the present invention is to provide a method for producing shadow work embroidery using a sewing machine (preferably one that is computerized and has digitizing software) which duplicates the appearance of hand stitched shadow work embroidery;

Another object is to provide such a method that yields shadow work embroidery having even a more enhanced, perfectly stitched appearance than hand stitched shadow work embroidery with less effort.

An additional object is to provide such a method which reduces the time necessary to produce shadow work embroidery designs;

A further object is to provide such shadow work embroidery using a machine which yields even a more enhanced embossed appearance than hand stitched shadow work embroidery; and An even further object is to reduce the cost of clothing having shadow work embroidery designs, by not employing hand stitches to do the labor.

The present invention accomplishes the above and other objects by providing a method for producing machine shadow work embroidery that simulates hand stitched shadow work embroidery by the use of two layers of material, an inner layer which may be fabric or a removable stabilizer material, and an outer layer of fabric. Examples of removable stabilizer material include, but are not limited to, water soluble plastic, heat soluble cloth and paperized fabric. On the inner layer of fabric or removable stabilizer the pattern of a design is stitched by a machine. Then an outer layer of fabric is placed over the inner layer of fabric or removable stabilizer material. Then the outline of the design is stitched by machine onto the outer layer of fabric through the inner layer of material to yield an embossed appearance of hand stitched shadow work embroidery. Once the two layers of material have been sewn together there are several optional procedures one may take to finalize the shadow work embroidery as follows:

A. Using a sheer fabric, such as organdy, as the outer layer of material, the outer layer could be left in its entirety together with the inner layer and used together as one piece of fabric in a garment or linens.

B. Using a sheer layer of fabric, such as organdy, as the inner layer, the excess of the inner layer beyond the design itself may be trimmed off close to the embroidery itself.

C. Using sheer fabric for both layers of material, you could use either method A or B.

D. If the inner layer of material used is any type of removable stabilizer, the stabilizer material may be removed by different ways depending on the type of stabilizer material used. For instance, if it is heat dissolvable threaded fabric it can be removed using an iron. If the stabilizer material is water soluble it can be removed by soaking in water. If it is tear away, such as paperized fabric stabilizer, it can be merely torn away leaving the design itself on the outer layer of fabric.

In each case where the inner material is a removable stabilizer material, when the initial digitizing of the sewing machine embroidery design is done, it must be done such that the outline stitch through both the outer and inner layers of material catches onto the threads of the embroidered thread design that has been stitched onto the layer of removable stabilizer. Thus, when the removable stabilizer is removed by various methods, determined by the type of stabilizer used, the embroidery thread design is caught onto the bottom or inner surface of the outer layer of fabric by the outline stitch.

Optionally, a second light tear-away stabilizer material under the inner layer of fabric or removable stabilizer can be used if necessary to provide more stability during the stitching process. After the entire stitching process is done, this light stabilizer is then torn away and removed.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
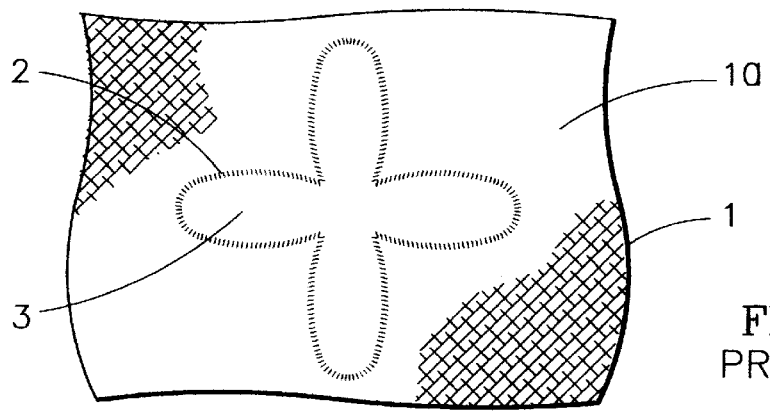
FIG. 1 is a front view of a shadow work embroidery design obtained by hand stitching.
Figure 2:
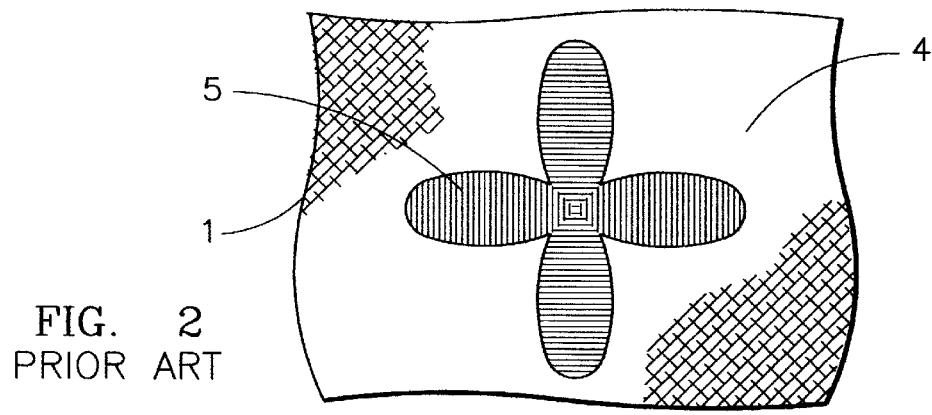
FIG. 2 is a rear view of a shadow work embroidery design obtained by hand stitching.
Figure 3:
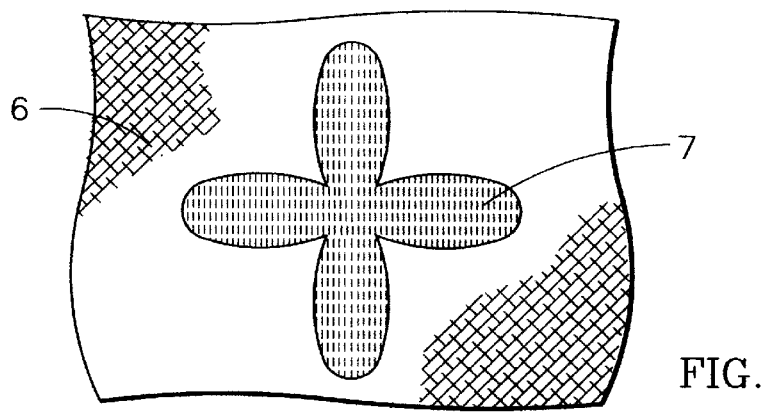
FIG. 3 is a top view of an inner layer of material showing a pattern sewn by machine as a first step in the method of this invention.
Figure 4:
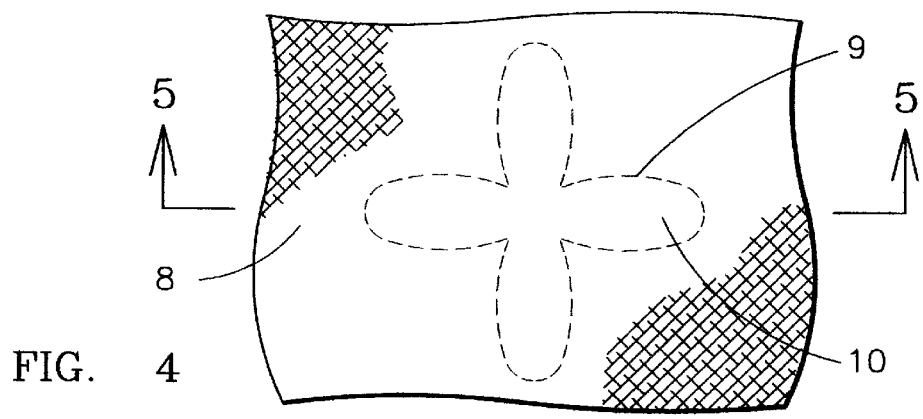
FIG. 4 is a top view of a completed shadow work embroidery performed by a sewing machine using the method of this invention.
Figure 5:
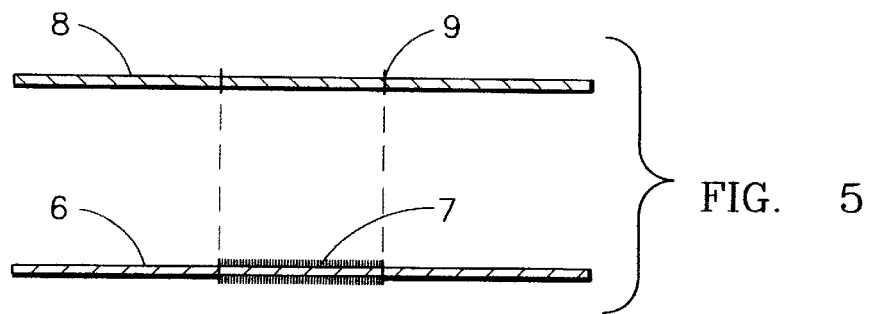
FIG. 5 is a exploded side cross-sectional view along lines 5—5 of FIG. 4 showing a completed shadow work embroidery made using the machine stitching method of this invention wherein both the inner and outer layers of material are fabric.
Figure 6:
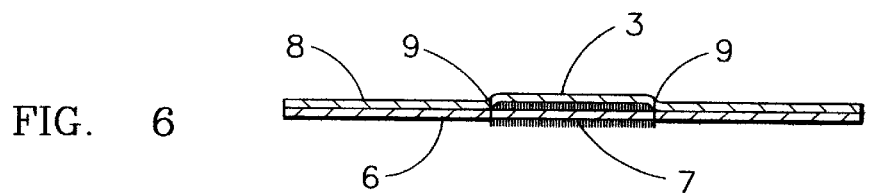
FIG. 6 is a side view showing the finished stitching of shadow work embroidery performed by a machine using this invention wherein both layers of material are fabric.

For purposes of describing the preferred embodiment, the terminology used in reference to the numbered components in the drawings is as follows:

1. fabric
1a. outer front of fabric material
2. outline stitches of design
3. shadow color of interior design showing through fabric
4. inside back of fabric material
5. crossed over stitches that produce shadow effect
6. inner layer of material
7. machine stitching of interior design pattern using machine threads
8. outer layer of material
9. machine stitched outline of design pattern
10. shadow colored effect from machine stitching showing through outer material
11. inner material being removable stabilizer
13. optional layer of removable stabilizer material Referring now to the drawings, FIGS. 1 and 2 show traditional shadow work embroidery performed by hand stitching which uses only one layer of fabric material 1. The fabric material 1 has a front side 1a which shows a hand stitched outline 2 of a design pattern having an interior 3 containing color created by the "shadow" of the cross stitching 5 on the back side 4 of the layer of fabric 1. Achieving a shadow work embroidery effect by hand stitching is accomplished by using a hand stitching needle and thread to pierce through the front side 1a of the fabric 1 and performing a cross stitch 5 on the back side of the fabric. This process is repeated over and over again until the entire outline 2 of the design appears on the front side 1a of the fabric 1 and the entire back side 4 of the design is filled in by cross stitching 5. This process is very time consuming and can take as much as several days to complete one design.

Unfortunately, although using a sewing machine is much faster than hand stitching, sewing machines cannot perform the cross stitching 5 on the back side of a fabric while performing only an outline stitch. A sewing machine can only perform an in-and-out, up-and-down motion which would leave threads on both the inner and outer surfaces of the fabric throughout the entire embroidery design and not just the outline as desired for shadow work embroidery. Thus, a sewing machine cannot duplicate the shadow work embroidery of hand stitching.

As shown and described in relation to FIGS. 3–8 the present invention uses at least two layers of material, an inner layer 6 or 11 and an outer layer 8. The outer layer of material 8 can be a light sheer fabric, such as organdy, or any other fabric which will allow color to show through it. The inner layer or layers of material 6 or 11 may be permanent fabric or removable stabilizer. On the inner layer or layers 6 or 11 an interior of a design pattern 7 is sewn by machine. The machine stitching leaves the interior of the pattern completely filled in by threads 7. The outer layer of fabric 8 is then placed over the inner layer of material 6 or 11 and a machine is used to sew the outline 9 of the design pattern. The outline is actually sewn through both the outer layer 8 and inner layer 6 or 11 so that the layers of material and in the case where the inner layer(s) is removable stabilizer material, embroidery threads become sewn together. If the inner layer 6 is fabric material then any excess beyond the design may be cut off as desired or left whole and the outer layer and inner layer of fabric can be used together as one fabric.

The resulting shadow work embroidery achieved by this invention is substantially similar and actually even better in appearance than hand stitched shadow work embroidery as it yields a colored, slightly embossed effect 10 due to the threads 7 on the inner layer of fabric 6 showing through the outer layer of fabric.

Figure 7:
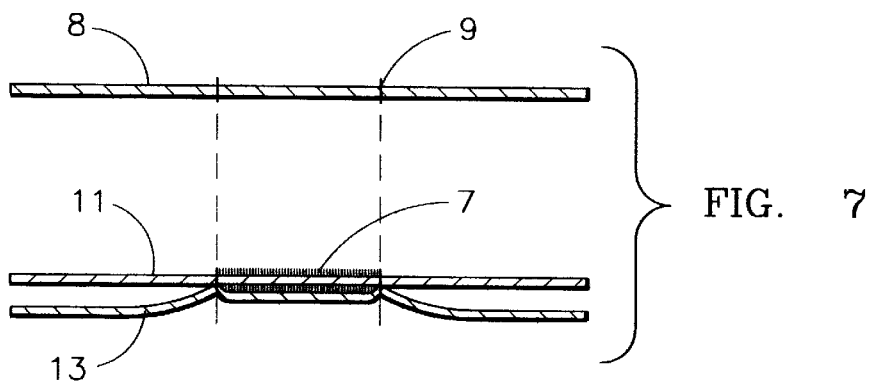
FIG. 7 is an exploded side view cross-sectional view along lines 5—5 of FIG. 4 using the machine stitching method of this invention wherein the inner layer or layers of material used are a removable stabilizer.
Figure 8:
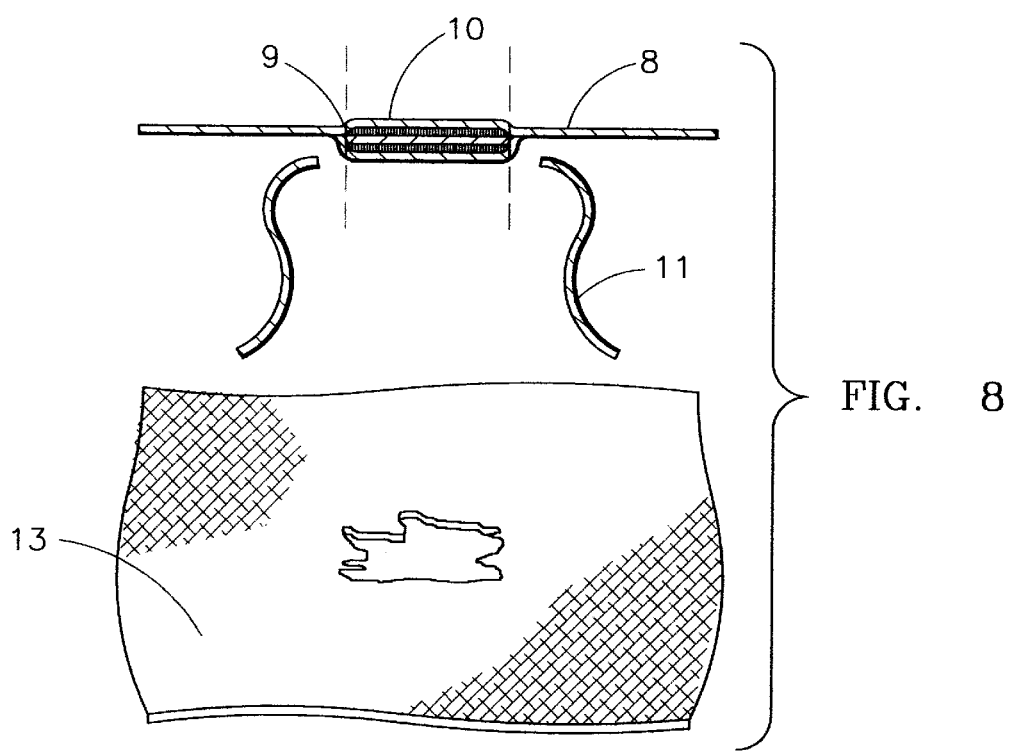
FIG. 8 is a side view showing the finished stitching of shadow work embroidery wherein the inner layer or layers of material are removable stabilizer material.

If the inner layer or layers of material is a stabilizer material then a more detailed explanation of the method of this invention in relation to FIGS. 7 and 8 is helpful. First, the interior of the embroidery design 7 is stitched onto the stabilizer 11, possibly using a second tear-away stabilizer 13 for extra stability during the stitching process. After the embroidery design 7 is stitched and before the outline 9 of the design is stitched an outer layer of fabric 8, in this case the garment or initial fabric, is placed over the embroidered stabilizer 13. The outline stitch 9 penetrates through the outer layer of fabric 8 and into the embroidery threads from the design 7 that has been stitched onto the stabilizer 11. This secures the colored embroidery threads of the design stitched to the inside surface of the outer layer of fabric 8, thus creating the shadow work embroidery effect.

When the outline stitch 9 is finished, any hanging threads from the design 7 may be cut away and remove the fabric, embroidery and removable stabilizer from the hoop on the sewing machine. If used, the tear-away stabilizer 13 can be torn away. Then depending on the removable stabilizer material 11 used, either burn it away by suing heat from an iron, wash it away by using water or by other means.

Thus, employing an inner material of removable stabilizers in this method, accomplishes virtually identical shadow work embroidery with a sewing machine as by hand stitching as the complete removal of the removable stabilizer eliminates the inner layer of material.

The use of this method in conjunction with a sewing machine significantly reduces the time to produce shadow work embroidery designs from as much as several days for hand sewing to as little as ten minutes, particularly if the pattern has been digitized on a computer and a computerized embroidery sewing machine with fabric-holding hoop readily available commercially is utilized. Moreover, using this invention not only saves time, but also the high cost of producing shadow work embroidery designs. As a result, clothing having shadow work embroidery made with this invention is more affordable and more readily available to consumers.

Although only a few embodiments of the present invention have been described in detail hereinabove, all improvements and modifications to this invention within the scope or equivalents of the claims are covered by this invention.

Having thus described my invention, I claim:

1. A method for producing shadow work embroidery using a sewing machine which simulates hand stitched shadow work embroidery, comprising the steps of:

stitching onto at least one inner layer of material an interior of a selected embroidery design;

placing an outer layer of material over the at least one inner layer of material; and stitching an outline of the selected embroidery design onto the outer layer of material through the at least one inner layer of material to yield a shadow work embroidery appearance on the outer layer of material, wherein the at least one inner layer of material is a removable stabilizer material.

2. The method of claim 1 further comprising the step of:

removing the stabilizer material.

3. The method of claim 2 wherein the stabilizer material is removed by heat.

4. The method of claim 2 wherein the stabilizer material is removed by water.

5. The method of claim 2 wherein the stabilizer material is removed by tearing it away.

6. A shadow work embroidery design using a sewing machine comprising:

at least one inner layer of material onto which is stitched an interior of an embroidery design; and an outer layer of material placed over the at least one inner layer of a material onto which an outline stitch of the embroidery design is sewn through both layers of material to yield shadow work embroidery, wherein the at least one inner layer of material is a removable stabilizer material.

7. The shadow work embroidery design of claim 6 wherein the outline stitch is also sewn to catch the embroidery design to allow the removable stabilizer material to be removed to leave only the shadow work embroidery design attached to an inside surface of the outer layer of material.

\* \* \* \* \*